United States Patent
Daellenbach et al.

(10) Patent No.: US 10,936,773 B1
(45) Date of Patent: Mar. 2, 2021

(54) SINK-BASED WIRE TAGGING IN MULTI-SINK INTEGRATED CIRCUIT NET

(71) Applicant: International Business Machines Corporation, Armonk, NY (US)

(72) Inventors: Lukas Daellenbach, Altdorf (DE); Sven Peyer, Tuebingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/550,557

(22) Filed: Aug. 26, 2019

(51) Int. Cl.
*G06F 30/327* (2020.01)
*G06F 30/392* (2020.01)
*G06F 119/12* (2020.01)
*G06F 119/18* (2020.01)

(52) U.S. Cl.
CPC .......... *G06F 30/327* (2020.01); *G06F 30/392* (2020.01); *G06F 2119/12* (2020.01); *G06F 2119/18* (2020.01)

(58) Field of Classification Search
USPC ....................................................... 716/103
See application file for complete search history.

(56) References Cited

U.S. PATENT DOCUMENTS

2006/0248488 A1* 11/2006 Habitz .................. G06F 30/394
716/126
2014/0223397 A1 8/2014 Alpert et al.
2017/0132351 A1 5/2017 Buehler et al.
2017/0212976 A1* 7/2017 Echegaray .......... G06F 30/3312
2018/0165405 A1* 6/2018 Braun ................. G06F 30/3312
2020/0050730 A1* 2/2020 Daellenbach ......... G06F 30/327

OTHER PUBLICATIONS

Alpert et al., "Interconnect Synthesis Without Wire Tapering", IEEE Transactions on Computer-Aided Design of Integrated Circuits and Systems, vol. 20, No. 1, Jan. 2001, pp. 90-104.
Hu et al., "A Timing-constrained Algorithm for Simultaneous Global Routing of Multiple Nets", ICCAD 2000, pp. 1-5.
Scheifele, Rudolf "RC-Aware Global Routing", ICCAD 2016, pp. 1-8.
Wei et al., "Catalyst: Planning Layer Directives for Effective Design Closure", DAC 2013, pp. 1-6.

* cited by examiner

*Primary Examiner* — Mohammed Alam
(74) *Attorney, Agent, or Firm* — Cantor Colburn LLP; Margaret McNamara

(57) ABSTRACT

Systems and methods to perform integrated circuit development include identifying one or more multi-sink nets in a design of the integrated circuit. Each of the one or more multi-sink nets includes a source that supplies signals to two or more sinks. A method includes determining a wire tag for each of the two or more sinks of each of the one or more multi-sink nets. Each wire tag defines characteristics of a wire connecting the source to the sink, and the characteristics include a wire width and a range of metal layers within the integrated circuit for traversal of the wire. The method also includes providing the design and the wire tags for fabrication of the integrated circuit.

20 Claims, 7 Drawing Sheets

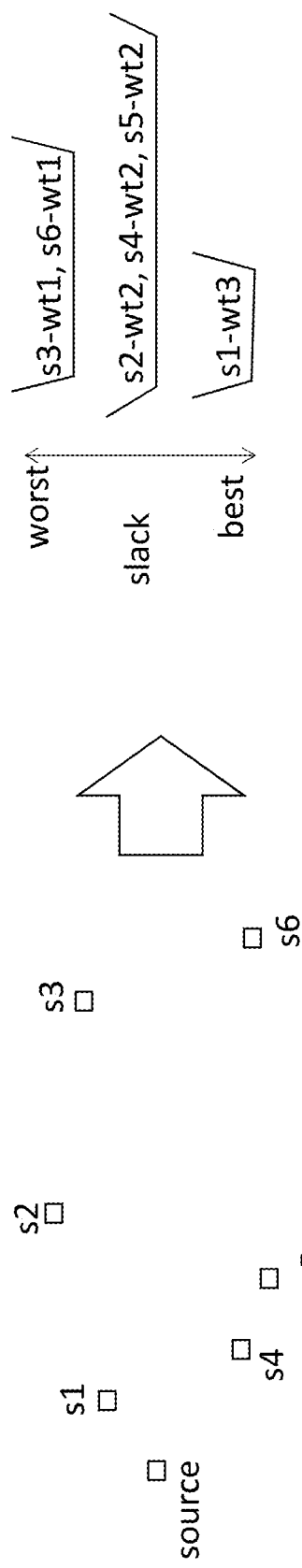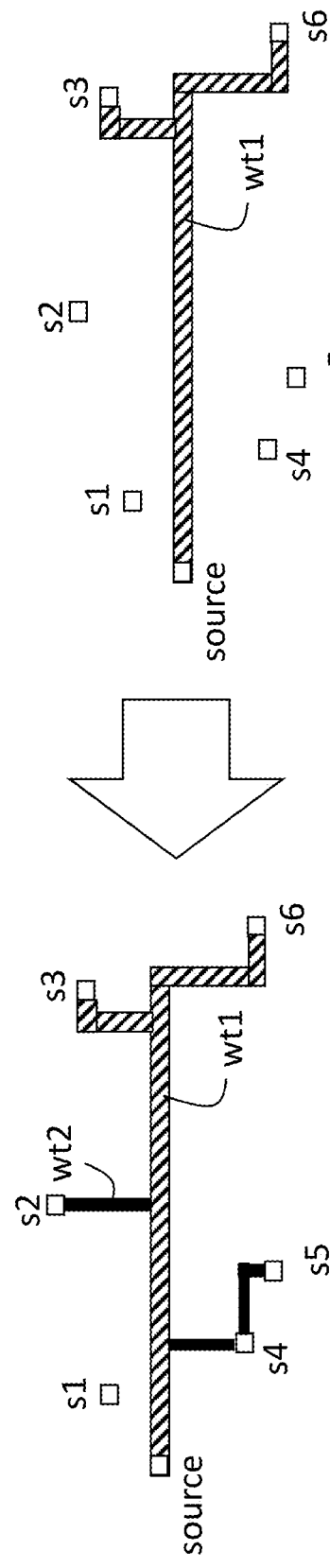

SINK-BASED WIRE TAGGING IN MULTI-SINK INTEGRATED CIRCUIT NET

BACKGROUND

The present invention relates to a routing phase of integrated circuit development, and more specifically, to sink-based wire tagging in a multi-sink integrated circuit net.

Integrated circuits or chips are designed and fabricated using a number of processes over several phases. The processes associated with developing the chip include obtaining a register transfer level (RTL) description and performing physical design to identify and place components such as gate logic. The physical design processes generally begin with logic synthesis, which maps the RTL description to a gate-level netlist (i.e., list of logical interconnects or nets), and end with tapeout and mask generation, which refers to turning the design data into photomasks that are used in the manufacturing process. The physical design processes also include routing, which refers to adding the wires that connect gates and other components to implement the nets of the netlist.

SUMMARY

Embodiments of the present invention are directed to systems and methods to perform integrated circuit development. An exemplary method includes identifying one or more multi-sink nets in a design of the integrated circuit. Each of the one or more multi-sink nets includes a source that supplies signals to two or more sinks. The method also includes determining a wire tag for each of the two or more sinks of each of the one or more multi-sink nets. Each wire tag defines characteristics of a wire connecting the source to the sink, and the characteristics include a wire width and a range of metal layers within the integrated circuit for traversal of the wire. The design and the wire tags are provided for fabrication of the integrated circuit.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

FIGS. 5A-5D illustrate aspects of sink-based wire tagging according to the exemplary method shown in FIG. 4, in which:

FIG. 5A shows a source and sinks in an exemplary multi-sink net;

FIG. 5B shows a result of sorting the sinks of the multi-sink net into buckets;

FIG. 5C shows the net with a first sink-based wire tag; and

FIG. 5D shows the net with a second sink-based wire tag;

DETAILED DESCRIPTION

Figure 1:
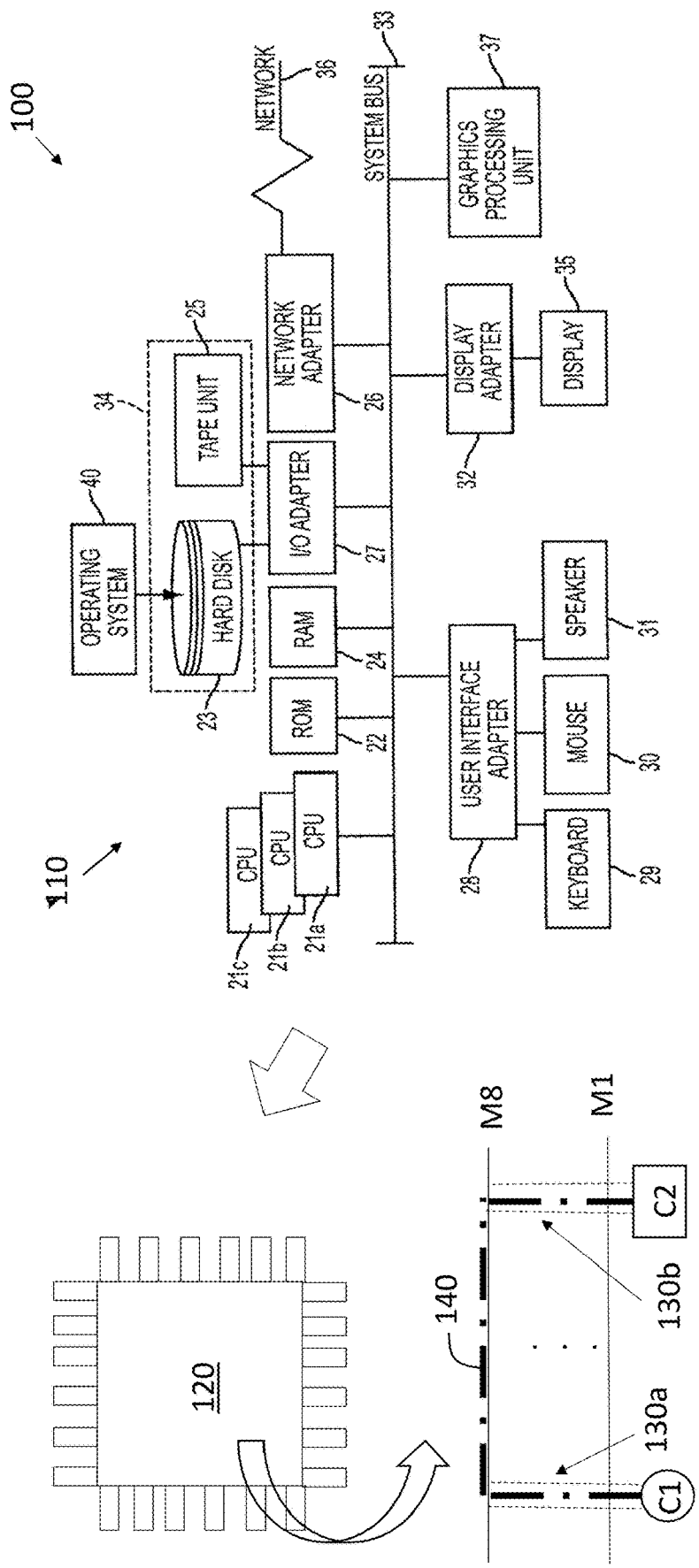
FIG. 1 is a block diagram of a system to perform sink-based wire tagging in a multi-sink integrated circuit net during integrated circuit development according to one or more embodiments of the invention.

As previously noted, the routing process within the physical design phase of integrated circuit development involves adding the wires to implement the interconnections or nets specified by the netlist. Generally, a net has a source (i.e., the component originating a signal carried by the wire) and a sink (i.e., the component that is the destination of the signal). Some nets are multi-sink nets meaning that a source provides a signal to more than one sink. Thus, a multi-sink net involves wires that branch to the multiple sinks from the same source. The sources and sinks, which are the components (e.g., logic gates, buffers, flip-flops) that implement the functionality of the integrated circuit, are in the silicon layer while the wires that interconnect them (i.e., connect an output pin of the source to the input pin of the sink) are formed on multiple vertical levels that are referred to as layers. Via holes are used to traverse the layers such that a given interconnecting wire can be in any one of the various layers. Wires formed on higher layers can generally be thicker and wider than wires formed on lower layers. As a result, higher metal layers (i.e., wires formed of metal on higher layers) exhibit lower resistance and faster signal propagation speeds than lower metal layers (i.e., wires formed on lower layers). Yet, forming every wire as a higher metal layer is not feasible due to congestion issues.

Thus, an important part of generating the routing specification involves balancing the tradeoff between speed (obtained at higher metal layers) and congestion (resulting from too many nets traversing higher metal layers) to determine which wires should be formed on which layers. Consequently, the determination of which layer a given wire should be formed on must consider the timing requirements for the sink receiving a signal through the given wire. Based on the required functionality for the integrated circuit, a required arrival time (RAT) is determined for each sink. During various phases of development, timing analysis is performed to ensure that the design will meet timing requirements. As part of the analysis, arrival time (AT) of a signal at a sink is compared with the RAT at the sink. If the AT value is smaller (i.e., sooner) than the RAT, then the sink is associated with a positive slack in the timing. If the AT value is larger (i.e., later) than the RAT, then the sink is associated with a negative slack. The slack determination can indicate which sinks are critical to meeting the design. That is, sinks with large negative slack are the most critical sinks whose timing must be addressed in order to meet design requirements. In a multi-sink net, typically, the most critical sink among the two or more sinks of the net is used to determine the width of the wire and, relatedly, the metal layer of the wire for the entire net. Based on the explanatory terminology used herein, the entire net is given the same wire tag according to a prior approach.

For explanatory purposes, a wire code is used to refer to a table of characteristics associated with a given wire. The wire code can indicate, among other things, the wire width and spacing, as well as the minimum metal layer that a metal layer with characteristics indicated by the wire code can be assigned to. The wire code and range of metal layers associated with a given connection from source to sink can be referred to as a tag or wire tag. As noted above, typically, the most critical sink of a multi-sink net is used to determine the wire tag for the entire net. That is, for a net with six sinks, even if only two of those sinks are critical and, therefore, require a particular wire tag (i.e., a particular wire width indicated by the wire code and traversal over a corresponding particular metal layer), all six sinks are assigned the same wire tag. A wire tag indicating a higher-level wire than needed for four of the six sinks results in unnecessary congestion at the higher level caused by this approach to handling the multi-sink net.

Embodiments of the invention detailed herein relate to sink-based wire tagging in a multi-sink integrated circuit net. That is, the wire tag used for every sink in a multi-sink net need not be the same. Instead, the wire tag for each sink is determined independently of the wire tag for other sinks of the multi-sink net. As a result, higher-level wires are not used unnecessarily for sinks among the multi-sink net that do not require them.

FIG. 1 is a block diagram of a system 100 to perform sink-based wire tagging in a multi-sink integrated circuit net 200 (FIG. 2) during integrated circuit development according to one or more embodiments of the invention. The system 100 includes a processing system 110 used to generate the design that is ultimately fabricated into an integrated circuit 120. As indicated by the side view, the exemplary integrated circuit 120 includes metal layers M1 through M8. Other exemplary integrated circuits 120 can include more or fewer metal layers. As previously noted, the higher the metal layer, the wider the wire 140 it can carry, and wider wires correspond with lower resistance and faster signal transmission. For example, a wider wire 140 can traverse metal layer M8 and carry a signal faster in comparison to the width and signal speed of a wire 140 that can traverse metal layer M1.

Two exemplary components C1 and C2 are shown. The component C1 can be a source, and the component C2 can be a sink in an exemplary single-sink net. A wire 140 from source component C1 through a set of vias 130a (i.e., a via stack) is shown to be formed on metal layer M8. This wire 140 is then routed down through another via 130b to the sink component C2. This characteristics and placement of the wire 140 are determined during the routing phase based on the wire tag assigned to the single-sink net connecting C1 to C2. According to embodiments of the invention that are detailed herein, the wire tag that specifies the wire code and metal layer range and that is used during routing to determine the characteristics and routing of the wire 140 is determined as sink-based rather than as net-based.

The steps involved in the fabrication of the integrated circuit 120 are well-known and briefly described herein. Once the physical layout is finalized, based, in part, on sink-based wire tagging in a multi-sink integrated circuit net according to embodiments of the invention to facilitate optimization of the routing plan, the finalized physical layout is provided to a foundry. Masks are generated for each layer of the integrated circuit based on the finalized physical layout. Then, the wafer is processed in the sequence of the mask order. The processing includes photolithography and etch. This is further discussed with reference to FIG. 7.

The processing system 110 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 110.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 110 can be stored in mass storage 34. The RAM 22, ROM 24, and mass storage 34 are examples of memory 19 of the processing system 110. A network adapter 26 interconnects system bus 33 with an outside network 36 enabling the processing system 110 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 110 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 110 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 110.

Figure 2:
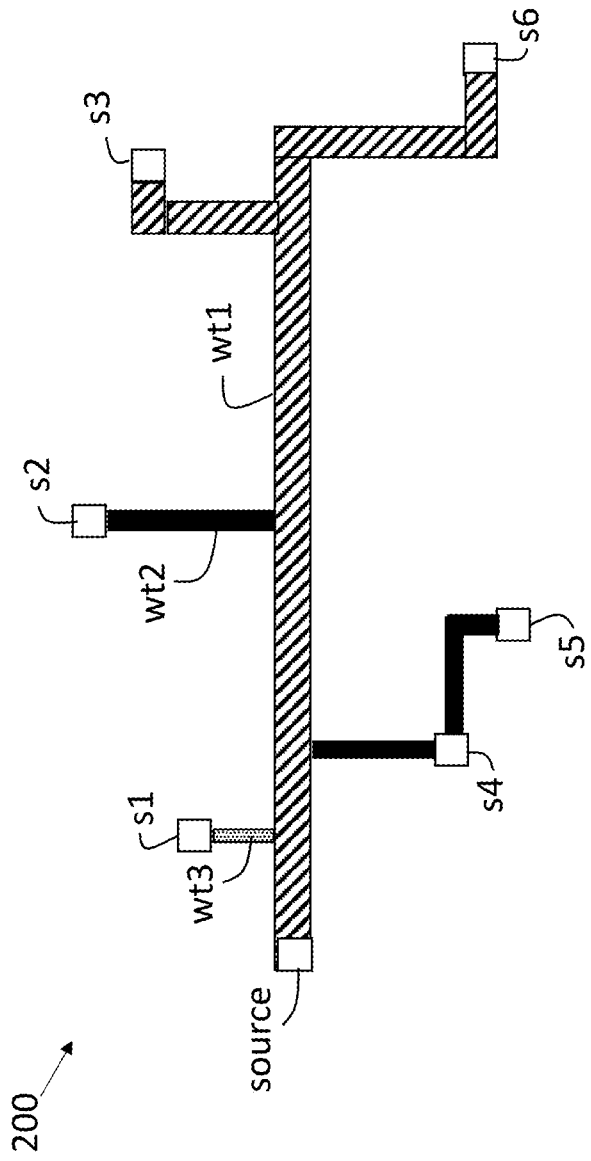
FIG. 2 is an exemplary multi-sink net shown with sink-based wire tagging according to one or more embodiments of the invention.

FIG. 2 is an exemplary multi-sink net 200 shown with sink-based wire tagging according to one or more embodiments of the invention. The exemplary multi-sink net 200 has one source that supplies six sinks s1 through s6 (generally referred to as sx). Three different wire tags wt1, wt2, and wt3 (generally referred to as wt) are determined for the exemplary multi-sink net 200 based on the timing slack of the sinks s1 through s6. In the exemplary multi-sink net 200, sinks s3 and s6 are the most critical. That is, timing analysis indicates that slack is most negative or least positive at sinks s3 and s6 compared with the other sinks of the net 200. Sinks s2, s4, and s5 are the next most critical, and sink s1 is the least critical.

According to prior approaches, the entire multi-sink net 200 would be assigned the same wire tag, and that wire tag would be dictated by the most critical sinks s3 and s6. However, according to one or more embodiments of the invention, the sinks s1 through s6 are assigned wire tags that correspond with their individual timing criticality. That is, the most critical sinks s3 and s6 are assigned a wire tag wt1, the next most critical sinks s2, s4, and s5 are assigned a different wire tag wt2, and the least critical sink s1 is assigned yet another wire tag wt3. The wire tag wt1 corresponds with a wire code that specifies a wider wire 140 and with a metal layer range that specifies a higher metal layer than wire tags wt2 and wt3. Similarly, the wire tag wt2 corresponds with a wire code that specifies a wider wire 140 and with a metal layer range that specifies a higher metal layer than wire tag wt3.

Figure 3:
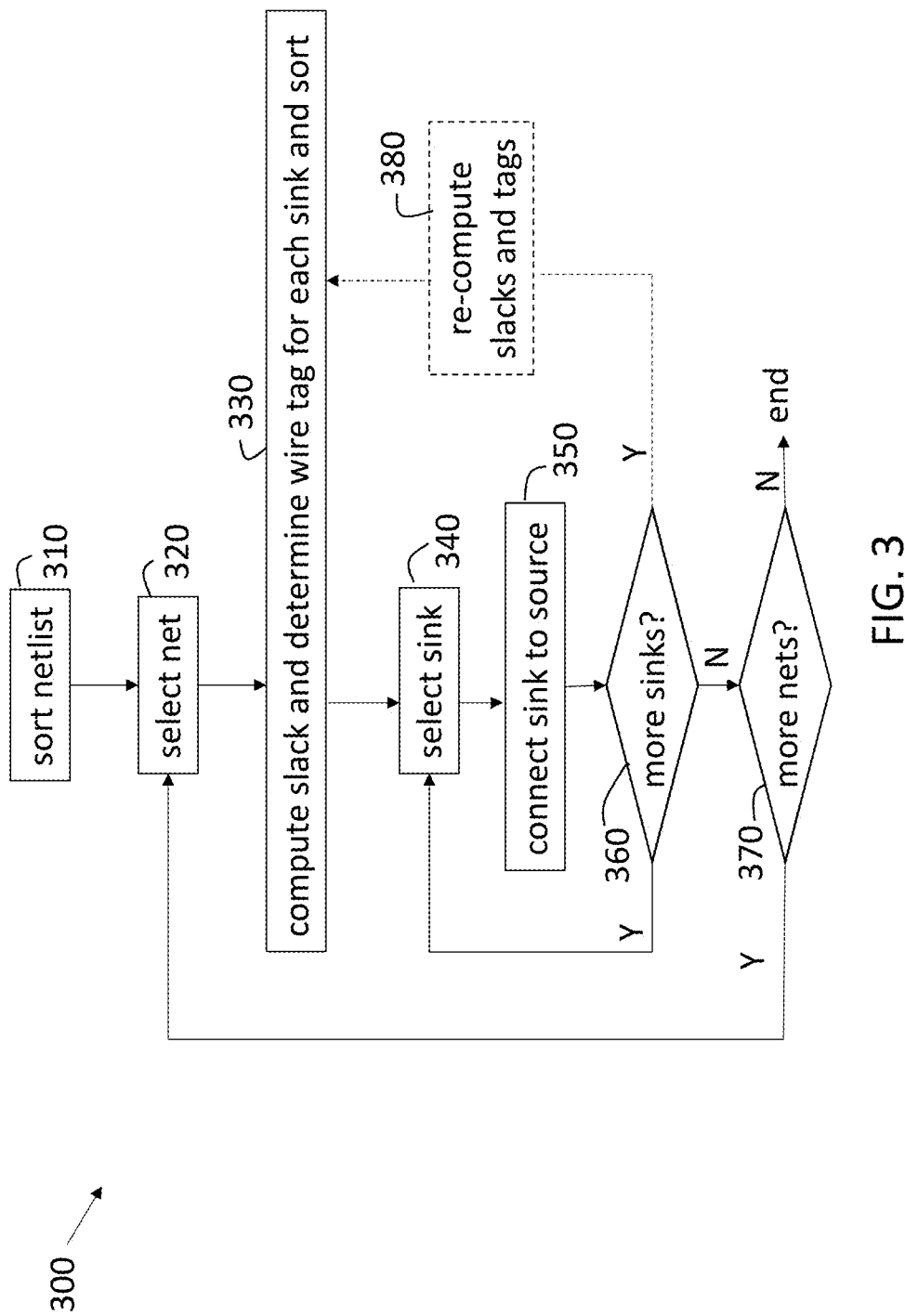
FIG. 3 is a process flow of a method of performing sink-based wire tagging according to an exemplary embodiment of the invention.

FIG. 3 is a process flow of a method 300 of performing sink-based wire tagging according to an exemplary embodiment of the invention. According to the embodiment discussed with reference to FIG. 3, each sink sx of each multi-sink net 200 is considered individually to determine the appropriate wire tag wt. At block 310, sorting the netlist of the integrated circuit 120 refers to ordering the multi-sink nets 200 according to a result of a timing analysis. For example, the ordering can be from the multi-sink net 200 with the worst slack (i.e., highest negative or lowest positive slack) to the best slack (i.e., highest positive or lowest negative slack). The timing analysis used to perform the sorting, at block 310, can abstract each multi-sink net 200 such that a slack value is obtained at the net-level rather than at the sink-level. At block 320, selecting a multi-sink net 200 refers to selecting the next multi-sink net 200 according to the sorted listing at block 310. At block 330, computing slack and determining a wire tag wt for each sink sx and sorting refers to determining the slack associated with each sink sx of the multi-sink net 200 that was selected at block 320, determining a wire tag wt corresponding with that slack, and sorting the sinks sx from the one with the worst slack to the one with the best slack. By selecting the wire tag wt based on the slack for each sink sx, the wire tag wt for each sink sx is selected independently of wire tags wt for any other sinks sx in the multi-sink net 200.

At block 340, selecting a sink sx refers to selecting the next sink sx according to the sorted listing at block 330. Connecting the sink sx to the source, at block 350, refers to part of the process of forming the multi-sink net 200. In the exemplary multi-sink net 200 shown in FIG. 2, sink s3 may have the worst (most critical) slack value followed by sink s6. The wire tag wt1 may be the same for both sinks s3 and s6 based on their slacks. According to the process at block 340, sink s3 would be selected first. Connecting the sink s3 to the source refers to forming the connection with wire tag wt1, as shown in FIG. 2. Connecting the sink s6, during the next iteration, includes adding only the piece from sink s6 to the connection already established to the source. Similarly, by the time sink s1 is selected, at block 340, connecting the sink s1 to the source, at block 350, refers to adding only the connection, with wire tag wt3, to the path already created to the source by the connection from sink s3 to the source, as shown in FIG. 2. At block 360, a check is done of whether there are more sinks sx to consider for the multi-sink net 200 selected at block 320. If so, then another sink sx of the multi-sink net 200 is selected at block 340 for another iteration of the processes at blocks 340 through 360. If the check at block 360 determines that there are no more sinks sx in the multi-sink net 200 that was selected at block 320, then the process flow proceeds to block 370.

At block 370, a check is done of whether there are more multi-sink nets 200 in the netlist. If so, then another multi-sink net 200 is selected at block 320 for another iteration of the processes at blocks 320 through 360. If the check at block 370 determines that there are no more multi-sink nets 200 in the netlist that was sorted at block 310, then the process flow ends. An optional process is shown at block 380. This process can be performed after the wire tag wt is determined for a given sink sx, at block 350, and it is determined, at block 360, that one or more sinks sx remain for wire tagging in the selected multi-sink net 200. At block 380, another timing analysis can be performed, based on the already-assigned wire tags wt, to determine if any of the remaining sinks sx should be re-ordered in the sorting at block 330.

Figure 4:
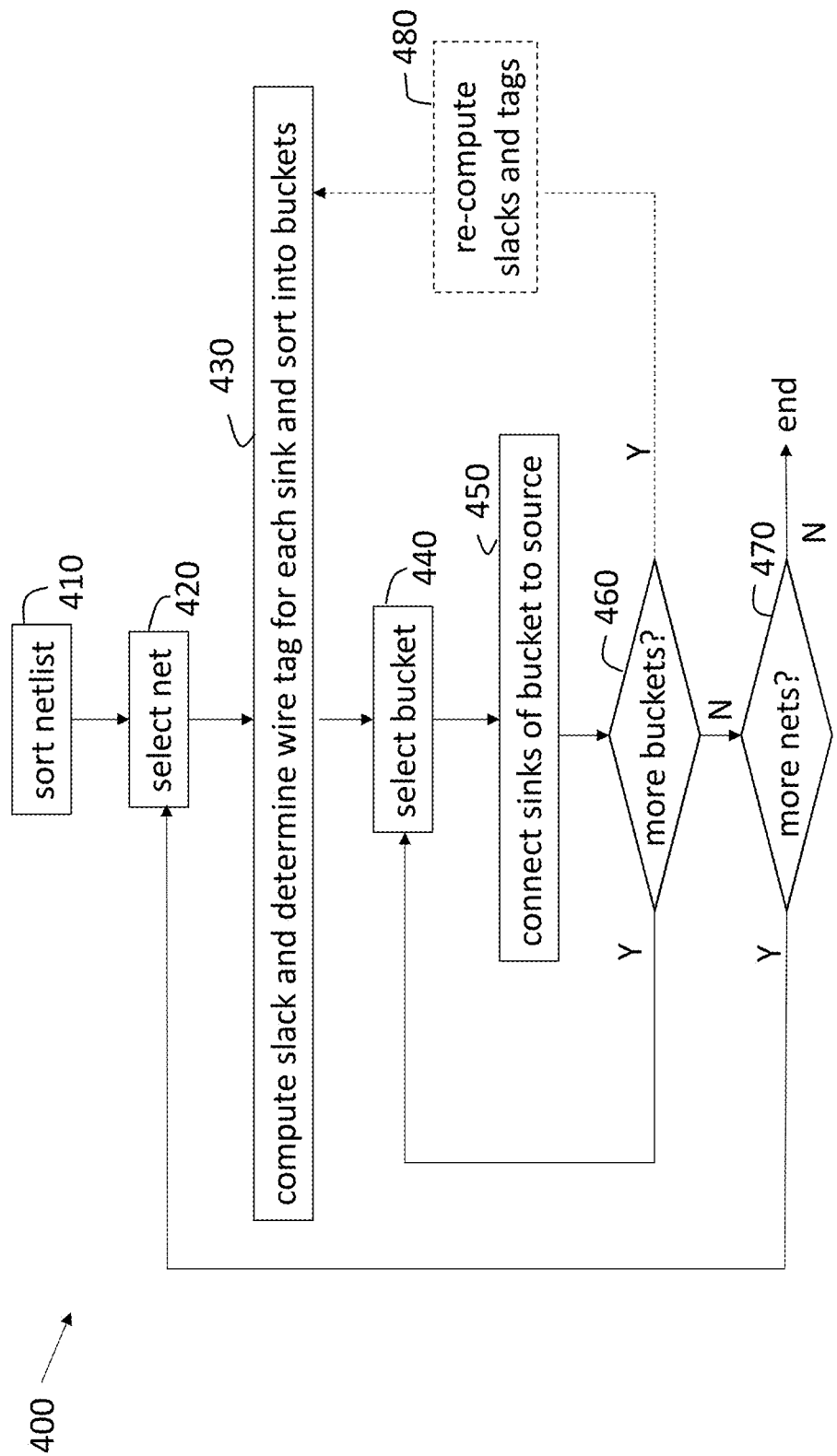
FIG. 4 is a process flow of a method of performing sink-based wire tagging according to another exemplary embodiment of the invention.

FIG. 4 is a process flow of a method 400 of performing sink-based wire tagging according to another exemplary embodiment of the invention. According to the embodiment discussed with reference to FIG. 4, the sinks sx of each multi-sink net 200 are considered in groups (i.e., buckets) based on their slack to determine the appropriate wire tag wt for every sink sx of the bucket. The processes at blocks 410 and 420 are the same as those at blocks 310 and 320 (FIG. 3). At block 410, sorting the netlist refers to using timing analysis results to order the multi-net nets 200 according to slack. At block 420, selecting a multi-sink net 200 refers to selecting the multi-sink net 200, among unselected multi-sink nets 200 of the netlist, with the worst slack.

At block 430, computing slack and determining the corresponding wire tag wt for each sink sx and sorting into buckets refers to determining the slack associated with each sink sx of the multi-sink net 200 that was selected at block 420, determining the wire tag wt corresponding with that slack, and sorting the sinks sx according to the wire tag wt associated with each, and grouping sinks sx with the same wire tag wt into the same bucket. At block 440 selecting a bucket refers to selecting a wire tag wt and the sinks sx with the same slack or slack range that were assigned that wire tag wt, at block 430. At block 450, the process flow includes connecting the sinks sx of the bucket selected at block 450 to the source. Thus, according to block 450, all the sinks sx of the multi-sink net 200 selected at block 420 that are assigned the same wire tag wt and, thus, are in the same bucket (see e.g., FIG. 5B) are connected to the source together, rather than individually as in the embodiment discussed with reference to FIG. 3. For example, both sink s3 and sink s6 are connected to the source using wire tag wt1 during one iteration of the process at block 450 (see e.g., FIG. 5C), rather than over two iterations of the process at block 350 (FIG. 3).

At block 460, a check is done of whether there are more buckets to consider for the multi-sink net 200 selected at block 420. If so, then another bucket is selected at block 440 for another iteration of the processes at blocks 440 through 460. If the check at block 460 determines that there are no more buckets of sinks sx in the multi-sink net 200 that was selected at block 420, then the process flow proceeds to block 470. At block 470, a check is done of whether there are more multi-sink nets 200 in the netlist. If so, then another multi-sink net 200 is selected at block 420 for another iteration of the processes at blocks 420 through 460. If the check at block 470 determines that there are no more multi-sink nets 200 in the netlist that was sorted at block 410, then the process flow ends. An optional process is shown at block 480. This process can be performed after the wire tag wt is determined for the sinks sx of a given bucket, at block 450, and it is determined, at block 460, that one or more buckets of sinks sx remain for wire tagging in the selected multi-sink net 200. At block 480, another timing analysis can be performed, based on the already-assigned wire tags wt, to determine if any of the remaining sinks sx should be re-ordered and re-sorted into buckets at block 430.

FIGS. 5A-5D illustrate aspects of sink-based wire tagging according to the exemplary method 400 shown in FIG. 4. The exemplary net 200 shown in FIG. 2 is used to illustrate aspects of the method 400. FIG. 5A shows an exemplary multi-sink net 200 selected at block 420. The exemplary multi-sink net 200 includes the source and its six sinks s1 through s6. FIG. 5B shows the results of sorting the sinks s1 through s6 into buckets according to the process at block 430. Three buckets or groupings of sinks sx are shown. The buckets are sorted from worst to best slack and the corresponding wire tag wt. As shown in FIG. 5B, sinks s3 and s6 are grouped in the bucket associated with the worst slack and with wire tag wt1. The sinks s3 and s6 may have the same slack value or, more likely, the sinks s3 and s6 have slack values that fall within a range defined for the bucket and corresponding with wire tag wt1. The sinks s2, s4, and s5 are grouped in the bucket associated with the next-worst slack and with wire tag wt2, and the sink s1 is in a bucket alone and has the best slack, corresponding with wire tag wt3.

FIG. 5C shows the result of performing the first iteration of block 450 to connect the sinks sx of a bucket of the multi-sink net 200 selected at block 420. As FIG. 5B indicates, the bucket selected in the first iteration, at block 440, for the exemplary case includes sinks s3 and s6, both corresponding with wire tag wt1. Thus, as shown in FIG. 5C, the wire tag wt1 is used, at block 450, to connect the sinks s3 and s6 to the source. FIG. 5D shows the results of performing the second iteration of block 450 to connect the sinks sx of the next bucket selected at block 420. As FIG. 5B indicates, the next bucket in the exemplary case includes sinks s2, s4, and s5. Thus, as shown in FIG. 5D, the wire tag wt2 is used, at block 450, to connect all three sinks s2, s4, and s5 to the source. Subsequently, another iteration of the processes at blocks 440 through 460 addresses sink s1 in the last bucket. The result is the connection of this sink s1 to the source.

Figure 6:
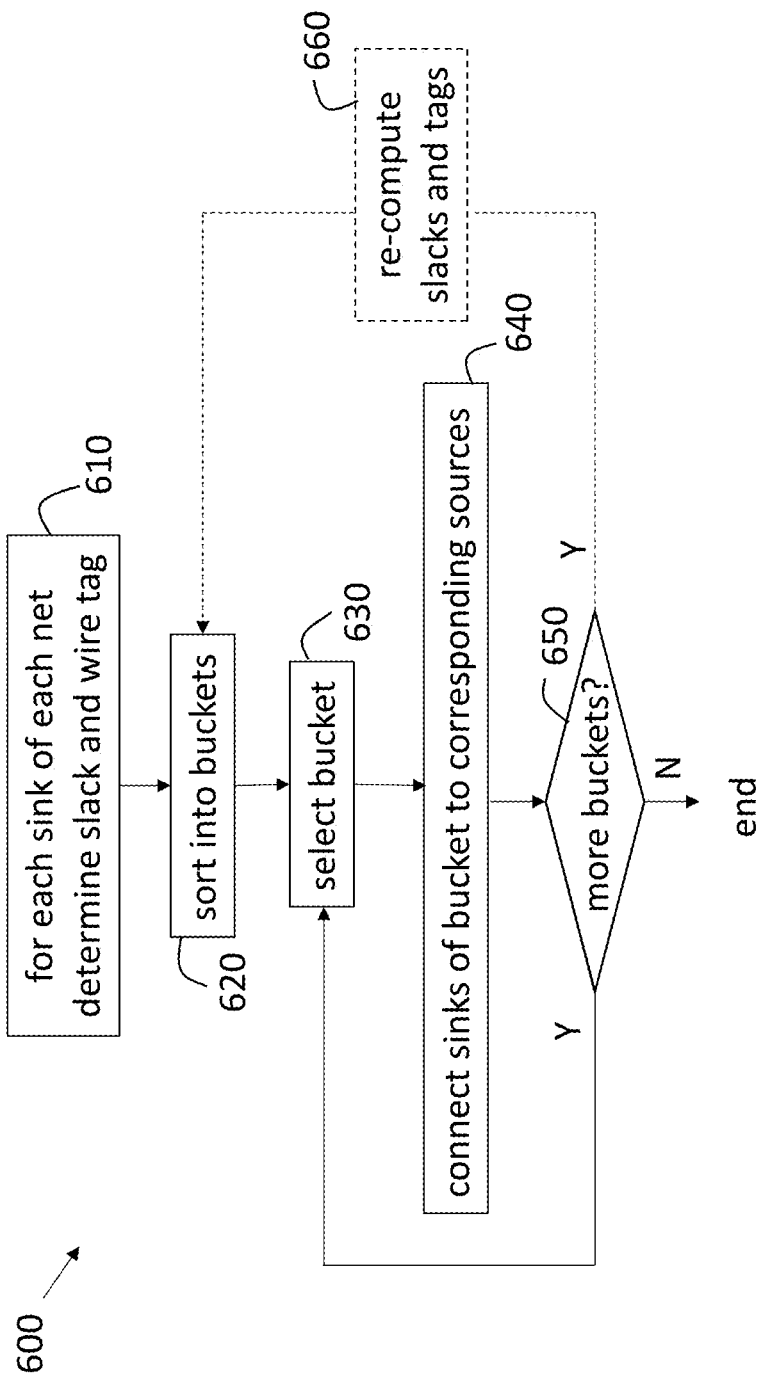
FIG. 6 is a process flow of a method of performing sink-based wire tagging according to yet another exemplary embodiment of the invention.

FIG. 6 is a process flow of a method 600 of performing sink-based wire tagging according to yet another exemplary embodiment of the invention. According to the embodiment discussed with reference to FIG. 6, the sinks sx of all multi-sink nets 200 are considered in groups (i.e., buckets) based on their slack to determine the appropriate wire tag wt for every sink sx of the bucket. At block 610, the process includes performing timing analysis to determine slack for each sink sx of each multi-sink net 200 and the corresponding wire tag wt. Thus, based on the process at block 610, every sink sx of every multi-sink net 200 has a corresponding wire tag wt assigned to it. At block 620, sorting the sinks sx into buckets includes grouping sinks sx based on their corresponding wire tag wt, regardless of the multi-sink net 200 to which they belong. The buckets can be ordered according to wire tag wt (i.e., the slack values or slack ranges that correspond to the wire tag wt assigned to every sink sx in the bucket). Sorting the buckets, at block 620, can include ordering the buckets according to those with sinks sx that have the worst slack to those with sinks sx that have the best slack.

At block 630, the processes include selecting a bucket from among the buckets sorted at block 620. Based on the sorting, selecting at block 630 refers to selecting the bucket, among unselected buckets, associated with the worst slack. Connecting sinks sx of the bucket to their corresponding sources, at block 640, includes using the same wire tag wt for all sinks sx of the bucket regardless of the multi-sink net 200 to which they belong. At block 650, a check is done of whether there are more buckets among those determined at block 620. If so, then another bucket is selected at block 630 for another iteration of the processes at blocks 630 through 650. If the check at block 650 determines that there are no more buckets, then the process flow ends. An optional process is shown at block 660. This process can be performed after the wire tag wt is determined for sinks sx of a given bucket, at block 640, and it is determined, at block 650, that one or more buckets of sinks sx remain for wire tagging. At block 660, another timing analysis can be performed, based on the already-assigned wire tags wt, to determine if any of the remaining sinks sx should be re-ordered and re-sorted into buckets at block 620.

Figure 7:
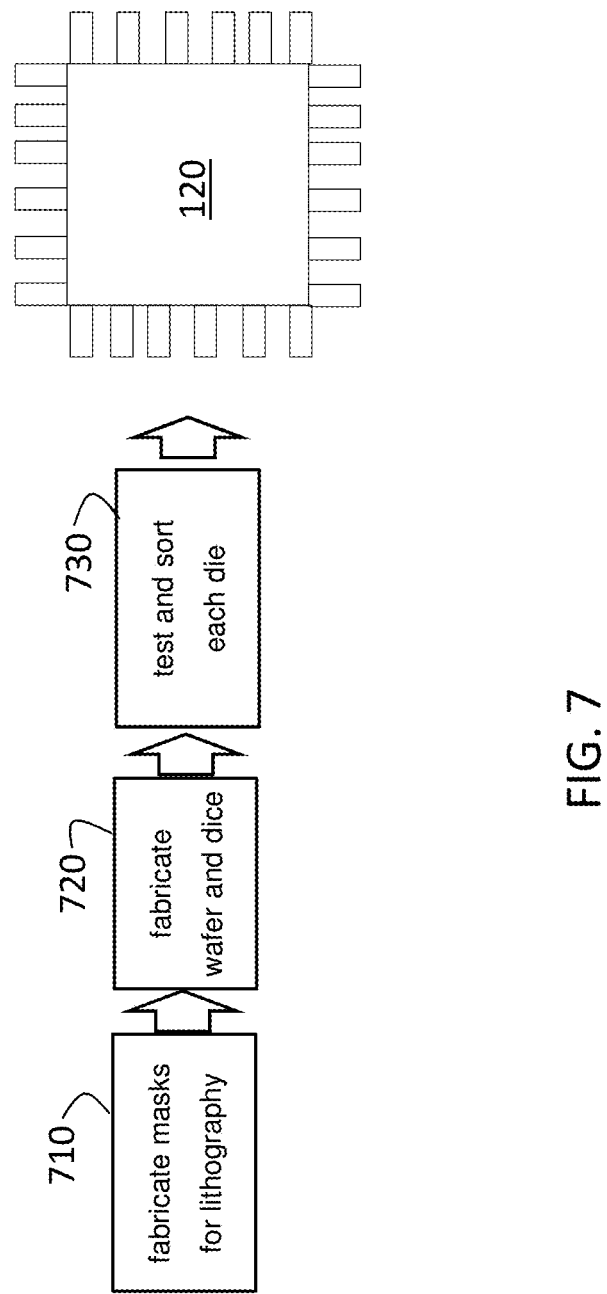
FIG. 7 is a process flow of a method of fabricating the integrated circuit according to exemplary embodiments of the invention.

FIG. 7 is a process flow of a method of fabricating the integrated circuit 120 according to exemplary embodiments of the invention. Once the physical design data is obtained, based, in part, sink-based wire tagging in a multi-sink integrated circuit net according to one or more embodiments of the invention (e.g., the exemplary method 300), the integrated circuit 120 can be fabricated according to known processes that are generally described with reference to FIG. 6. Generally, a wafer with multiple copies of the final design is fabricated and cut (i.e., diced) such that each die is one copy of the integrated circuit 120. At block 610, the processes include fabricating masks for lithography based on the finalized physical layout. At block 620, fabricating the wafer includes using the masks to perform photolithography and etching. Once the wafer is diced, testing and sorting each die is performed, at block 630, to filter out any faulty die.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method of performing integrated circuit development, the method comprising:
    identifying, using a processor, one or more multi-sink nets in a design of the integrated circuit, wherein each of the one or more multi-sink nets includes a source that supplies signals to two or more sinks;
    determining, using the processor, a wire tag for each of the two or more sinks of each of the one or more multi-sink nets, wherein each wire tag defines characteristics of a wire connecting the source to the sink, the characteristics including a wire width and a range of metal layers within the integrated circuit for traversal of the wire, and the wire tags corresponding with at least two sinks of the two or more sinks within at least one of the one or more multi-sink nets are different; and
    providing the design and the wire tags for fabrication of the integrated circuit.

2. The method according to claim 1, further comprising determining a timing slack associated with each of the one or more multi-sink nets and sorting the one or more multi-sink nets from least to most timing slack.

3. The method according to claim 2, further comprising selecting each of the one or more multi-sink nets as a selected multi-sink net in turn based on the sorting of the one or more multi-sink nets, determining a timing slack associated with each of the two or more sinks of the selected multi-sink net, determining the wire tag for each of the two or more sinks of the selected multi-sink net based on the timing slack, and sorting the two or more sinks of the selected multi-sink net from least to most timing slack.

4. The method according to claim 3, further comprising connecting each of the two or more sinks of the selected multi-sink net to the source of the selected multi-sink net on a one-sink-at-a-time basis according to the sorting of the two or more sinks.

5. The method according to claim 3, further comprising grouping the two or more sinks of the selected multi-sink net into one or more groups based on the wire tag associated with each of the two or more sinks, and connecting all the sinks of each of the one or more groups to the source of the selected multi-sink net on a one-group-at-a-time basis.

6. The method according to claim 1, further comprising determining a timing slack associated with each of the two or more sinks of each of the one or more multi-sink nets, and grouping all of the two or more sinks of all of the one or more multi-sink nets into one or more groups based on the wire tag associated with each of the two or more sinks of each of the one or more multi-sink nets.

7. The method according to claim 6, further comprising connecting all the sinks of each of the one or more groups to corresponding ones of the sources of the one or more multi-sink nets on a one-group-at-a-time basis.

8. The method according to claim 7, wherein the one group at a time basis is ordered according to the timing slack associated with each of the one or more groups, and the method further comprises re-computing timing slack and re-grouping all the sinks of remaining ones of the one or more groups.

9. A system to perform integrated circuit development, the system comprising:
a memory device configured to store a design of the integrated circuit; and
a processor configured to identify one or more multi-sink nets in the design of the integrated circuit, each of the one or more multi-sink nets including a source that supplies signals to two or more sinks, and to determine a wire tag for each of the two or more sinks of each of the one or more multi-sink nets, each wire tag defining characteristics of a wire connecting the source to the sink, and the characteristics including a wire width and a range of metal layers within the integrated circuit for traversal of the wire, wherein the design and the wire tags are provided for fabrication of the integrated circuit, wherein the wire tags corresponding with at least two sinks of the two or more sinks within at least one of the one or more multi-sink nets are different.

10. The system according to claim 9, wherein the processor is further configured to determine a timing slack associated with each of the one or more multi-sink nets and sort the one or more multi-sink nets from least to most timing slack.

11. The system according to claim 10, wherein the processor is further configured to select each of the one or more multi-sink nets as a selected multi-sink net in turn based on the sorting of the one or more multi-sink nets, to determine a timing slack associated with each of the two or more sinks of the selected multi-sink net, to determine the wire tag for each of the two or more sinks of the selected multi-sink net based on the timing slack, and to sort the two or more sinks of the selected multi-sink net from least to most timing slack.

12. The system according to claim 11, wherein the processor is further configured to connect each of the two or more sinks of the selected multi-sink net to the source of the selected multi-sink net on a one-sink-at-a-time basis according to the sorting of the two or more sinks.

13. The system according to claim 11, wherein the processor is further configured to group the two or more sinks of the selected multi-sink net into one or more groups based on the wire tag associated with each of the two or more sinks and to connect all the sinks of each of the one or more groups to the source of the selected multi-sink net on a one-group-at-a-time basis.

14. The system according to claim 9, wherein the processor is further configured to determine a timing slack associated with each of the two or more sinks of each of the one or more multi-sink nets, and to group all of the two or more sinks of all of the one or more multi-sink nets into one or more groups based on the wire tag associated with each of the two or more sinks of each of the one or more multi-sink nets.

15. The system according to claim 14, wherein the processor is further configured to connect all the sinks of each of the one or more groups to corresponding ones of the sources of the one or more multi-sink nets on a one-group-at-a-time basis.

16. The system according to claim 15, wherein the one group at a time basis is ordered according to the timing slack associated with each of the one or more groups, and the processor is further configured to re-compute timing slack and re-group all the sinks of remaining ones of the one or more groups.

17. A computer program product for performing integrated circuit development, the computer program product comprising a computer readable storage medium having program instructions embodied therewith, the program instructions executable by a processor to perform a method comprising:
identifying one or more multi-sink nets in a design of the integrated circuit, wherein each of the one or more multi-sink nets includes a source that supplies signals to two or more sinks; and
determining a wire tag for each of the two or more sinks of each of the one or more multi-sink nets, wherein each wire tag defines characteristics of a wire connecting the source to the sink, the characteristics including a wire width and a range of metal layers within the integrated circuit for traversal of the wire, wherein the design and the wire tags are provided for fabrication of the integrated circuit and the wire tags corresponding with at least two sinks of the two or more sinks within at least one of the one or more multi-sink nets are different.

18. The computer program product according to claim 17, further comprising determining a timing slack associated with each of the one or more multi-sink nets and sorting the one or more multi-sink nets from least to most timing slack, selecting each of the one or more multi-sink nets as a selected multi-sink net in turn based on the sorting of the one or more multi-sink nets, determining a timing slack associated with each of the two or more sinks of the selected multi-sink net, determining the wire tag for each of the two or more sinks of the selected multi-sink net based on the timing slack, and sorting the two or more sinks of the selected multi-sink net from least to most timing slack.

19. The computer program product according to claim 18, further comprising connecting each of the two or more sinks of the selected multi-sink net to the source of the selected multi-sink net on a one-sink-at-a-time basis according to the sorting of the two or more sinks, or grouping the two or more sinks of the selected multi-sink net into one or more groups based on the wire tag associated with each of the two or more sinks, and connecting all the sinks of each of the one or more groups to the source of the selected multi-sink net on a one-group-at-a-time basis.

20. The computer program product according to claim 17, further comprising determining a timing slack associated with each of the two or more sinks of each of the one or more multi-sink nets, and grouping all of the two or more sinks of all of the one or more multi-sink nets into one or more groups based on the wire tag associated with each of the two or more sinks of each of the one or more multi-sink nets, and connecting all the sinks of each of the one or more groups to corresponding ones of the sources of the one or more multi-sink nets on a one-group-at-a-time basis, wherein the one group at a time basis is ordered according to the timing slack associated with each of the one or more groups, and the method further comprises re-computing timing slack and re-grouping all the sinks of remaining ones of the one or more groups.

* * * * *